United States Patent
Espinoza

(10) Patent No.: US 12,333,916 B2
(45) Date of Patent: Jun. 17, 2025

(54) WEIGHT SENSING PARKING PAD DEVICE

(71) Applicant: Lluvia Espinoza, Bakersfield, CA (US)

(72) Inventor: Lluvia Espinoza, Bakersfield, CA (US)

(*) Notice: Subject to any disclaimer, the term of this patent is extended or adjusted under 35 U.S.C. 154(b) by 4 days.

(21) Appl. No.: 18/375,139

(22) Filed: Sep. 29, 2023

(65) Prior Publication Data
US 2025/0111760 A1    Apr. 3, 2025

(51) Int. Cl.
  *G08B 13/10* (2006.01)
  *B60R 25/102* (2013.01)
  *G08B 13/00* (2006.01)
  *B60R 25/10* (2013.01)

(52) U.S. Cl.
  CPC ............ *G08B 13/10* (2013.01); *B60R 25/102* (2013.01); *G08B 13/00* (2013.01); *B60R 2025/1016* (2013.01); *B60R 2325/205* (2013.01)

(58) Field of Classification Search
CPC ..... B60R 25/00; B60R 25/10; B60R 25/1004; G08B 13/10; G08B 13/14; G08B 13/1472; G08B 13/22; G08B 13/2417; G08B 23/00
See application file for complete search history.

(56) References Cited

U.S. PATENT DOCUMENTS

| | | | |
|---|---|---|---|
| 4,147,246 A | 4/1979 | Stevens | |
| D433,660 S | 11/2000 | Hough | |
| 6,707,386 B1 | 3/2004 | Pruisner | |
| 7,619,543 B1 | 11/2009 | Todinca | |
| 9,007,194 B1* | 4/2015 | Toews | B60R 25/1004 340/426.2 |
| 10,115,484 B2 | 10/2018 | Zitt | |
| 2013/0033381 A1* | 2/2013 | Breed | G08B 13/2417 340/568.1 |
| 2018/0342158 A1 | 11/2018 | Carannante | |
| 2021/0291730 A1* | 9/2021 | De La Cruz | B60Q 9/00 |

FOREIGN PATENT DOCUMENTS

EP    3407277    11/2018

* cited by examiner

*Primary Examiner* — Van T Trieu

(57) ABSTRACT

A weight sensing parking pad device includes a pad having a length and a width that is sufficient to accommodate a tire of a motorized vehicle. The pad can be placed on a support surface to facilitate the tire of the motorized vehicle to be parked upon the pad. A weight sensor is integrated into the pad to sense the weight of the tire when the motorized vehicle is parked on the pad. A communication unit is integrated into the pad and the communication unit is in remote communication with a personal electronic device. The communication unit broadcasts an alert to the personal electronic device when the weight sensor ceases to sense weight after having sensed weight for a minimum duration of time. In this way user is notified that the motorized vehicle has been moved from the pad and has potentially been stolen.

6 Claims, 4 Drawing Sheets

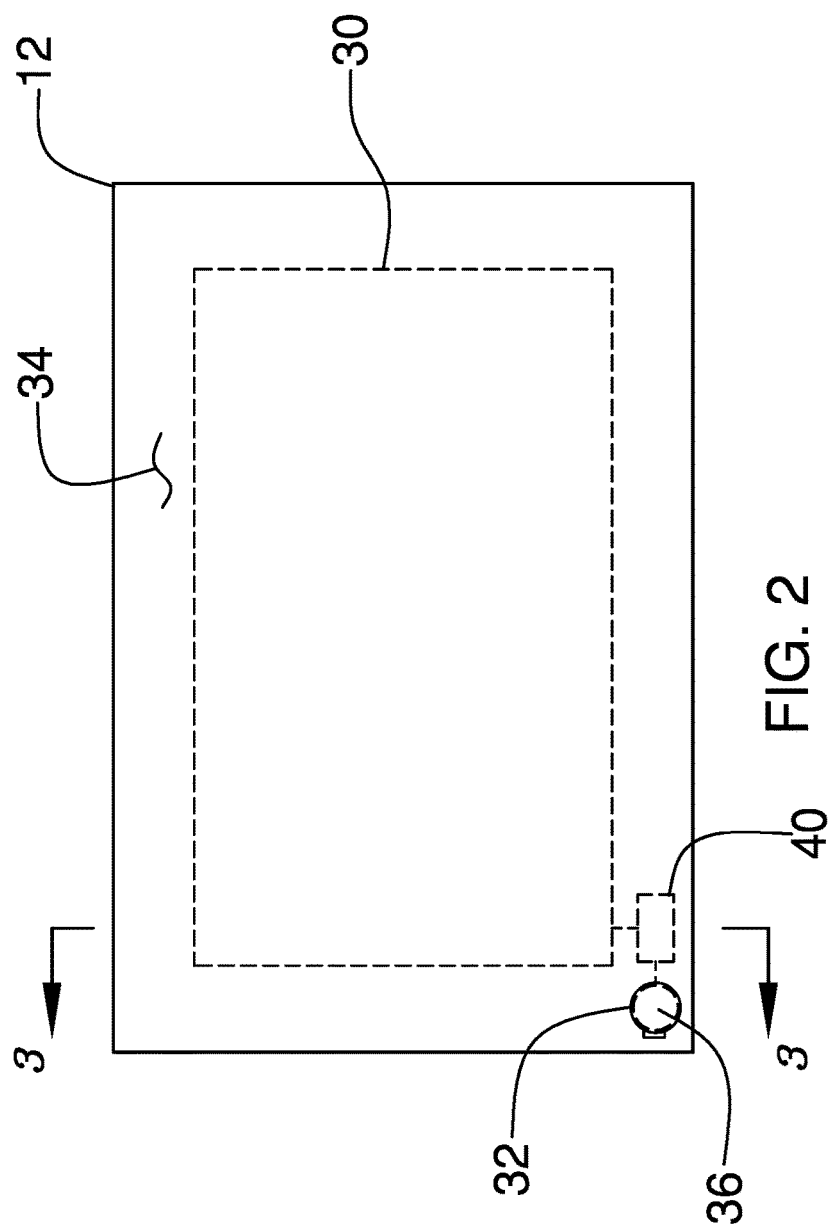
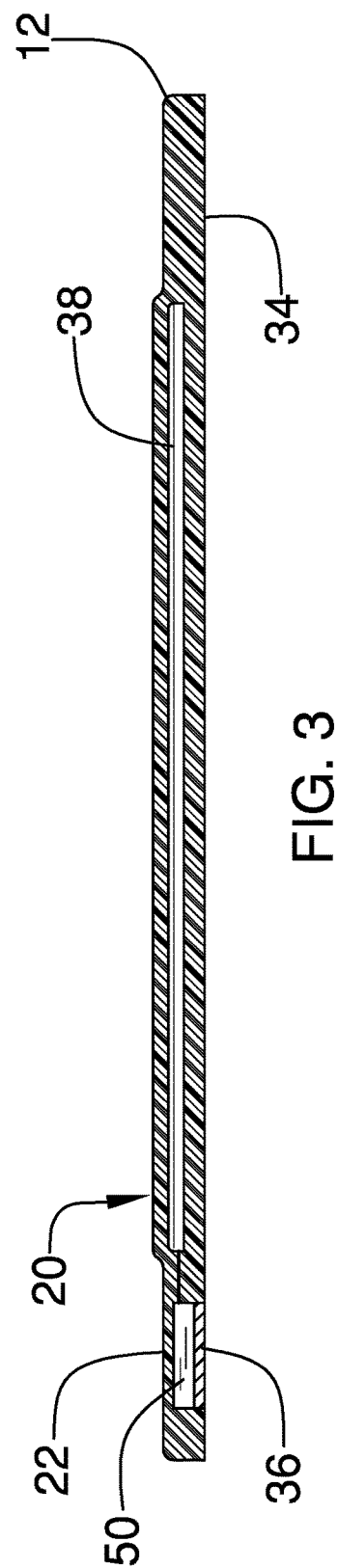

WEIGHT SENSING PARKING PAD DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to parking pad devices and more particularly pertains to a new parking pad devices for alerting a user when a vehicle has been moved from a parking spot. The device includes a pad that is positionable on a parking spot and a weight sensor integrated into the pad to sense the weight of a tire of a vehicle and a communication unit integrated into the pad that is in remote communication with a personal electronic device for alerting a user when the weight sensor no longer senses the weight of the tire.

(2) Description of Related Art Including Information Disclosed Under 37 CFR 1.97 and 1.98

The prior art relates to parking pad devices including a variety of parking pads which each has a weight sensor for sensing weight of a vehicle and either a wireless alarm receiver that emits an audible alarm when the weight sensor no longer senses weight or an alarm integrated into the parking pad which emits an audible alarm when the weight sensor no longer senses weight. In no instance does the prior art disclose a parking pad which has a weight sensor for sensing weight of a vehicle and a communication unit integrated into the pad which is in wireless communication with a personal electronic device for alerting a user of the personal electronic device that the weight sensor no longer senses weight.

BRIEF SUMMARY OF THE INVENTION

An embodiment of the disclosure meets the needs presented above by generally comprising a pad having a length and a width that is sufficient to accommodate a tire of a motorized vehicle. The pad can be placed on a support surface to facilitate the tire of the motorized vehicle to be parked upon the pad. A weight sensor is integrated into the pad to sense the weight of the tire when the motorized vehicle is parked on the pad. A communication unit is integrated into the pad and the communication unit is in remote communication with a personal electronic device. The communication unit broadcasts an alert to the personal electronic device when the weight sensor ceases to sense weight after having sensed weight for a minimum duration of time. In this way user is notified that the motorized vehicle has been moved from the pad and has potentially been stolen.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a bottom phantom view of an embodiment of the disclosure.

FIG. 3 is a cross sectional view taken along line 3-3 of FIG. 2 of an embodiment of the disclosure.

DETAILED DESCRIPTION OF THE INVENTION

Figure 1:
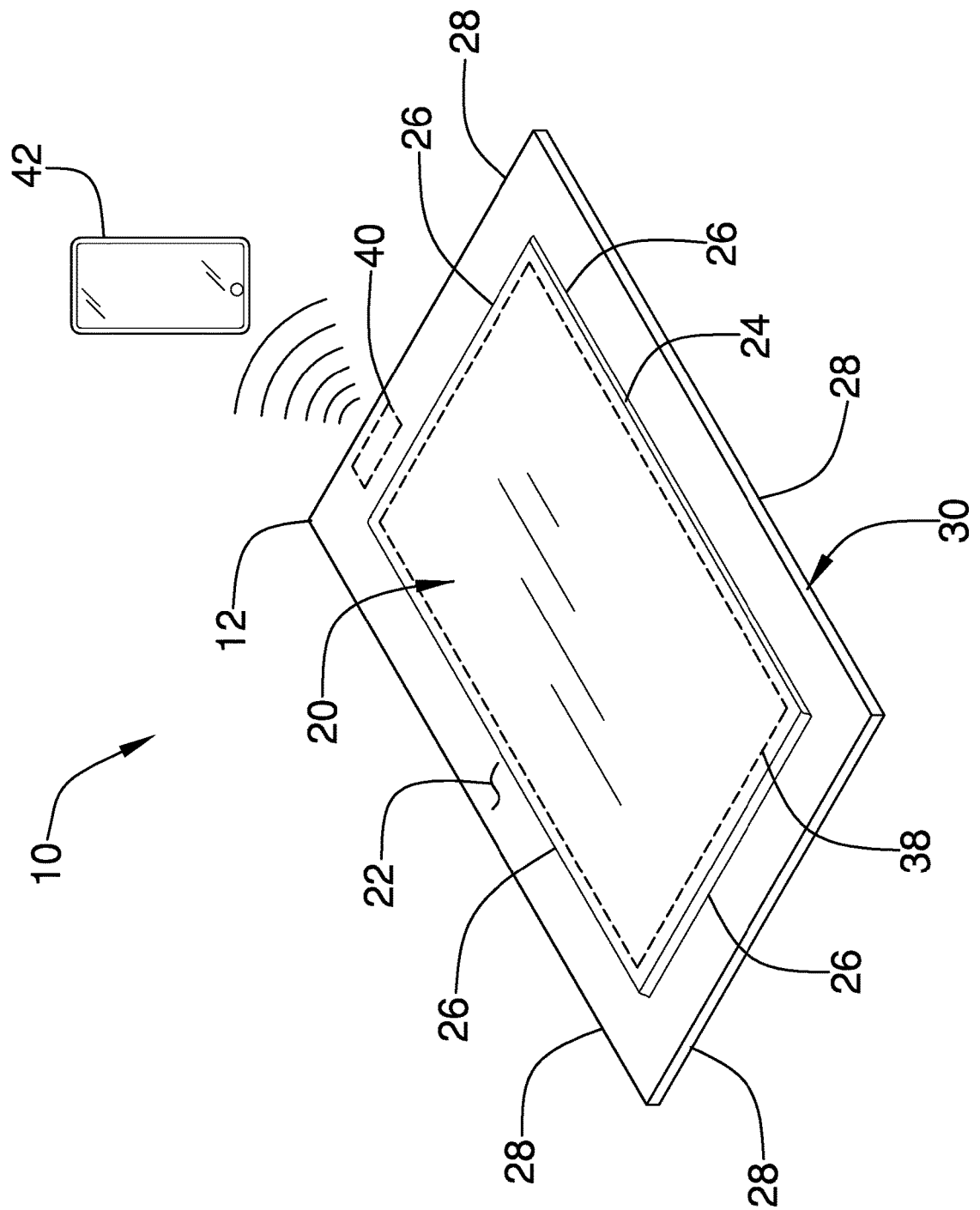
FIG. 1 is a top perspective view of a weight sensing parking pad device according to an embodiment of the disclosure.
Figure 4:
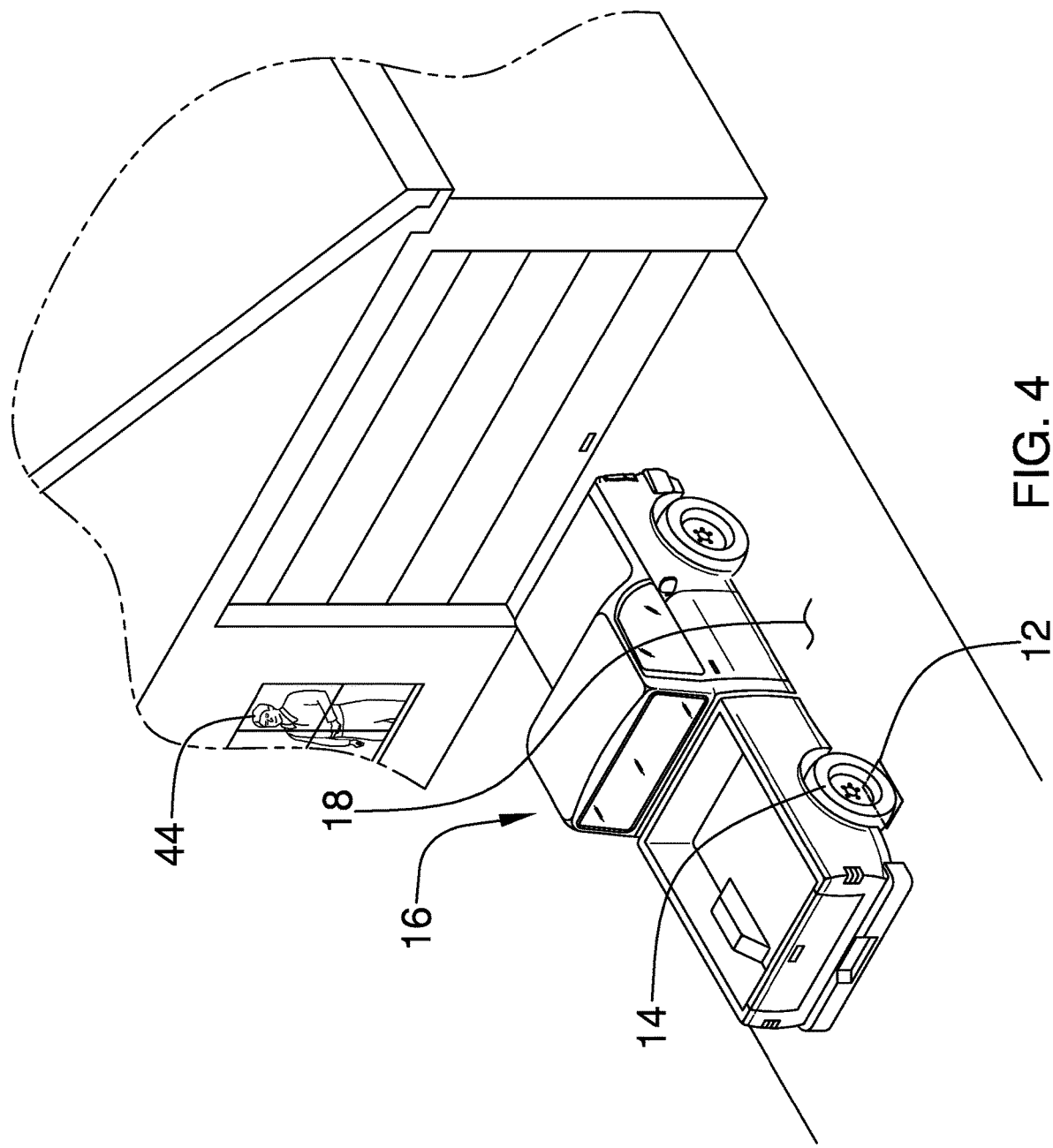
FIG. 4 is a perspective in-use view of an embodiment of the disclosure.
Figure 5:
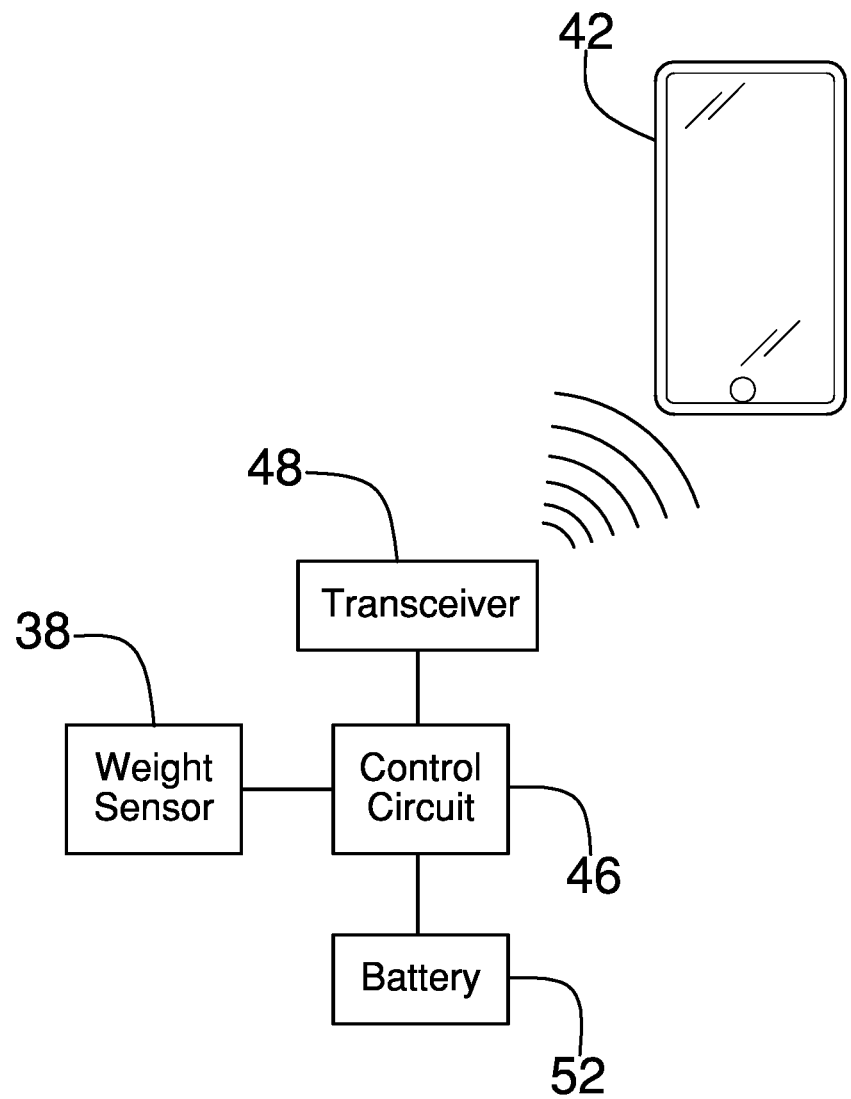
FIG. 5 is a schematic view of an embodiment of the disclosure.

With reference now to the drawings, and in particular to FIGS. 1 through 5 thereof, a new parking pad devices embodying the principles and concepts of an embodiment of the disclosure and generally designated by the reference numeral 10 will be described.

As best illustrated in FIGS. 1 through 5, the weight sensing parking pad device 10 generally comprises a pad 12 that has a length and a width that is sufficient to accommodate a tire 14 of a motorized vehicle 16. In this way the pad 12 can be placed on a support surface 18 to facilitate the tire 14 of the motorized vehicle 16 to be parked upon the pad 12. The motorized vehicle 16 may be a passenger vehicle, a cargo vehicle or any other type of motorized vehicle that is commonly driven on public roadways and the support surface 18 may be a driveway or other location where the motorized vehicle 16 is parked. The pad 12 is comprised of a resilient material, including but not being limited to rubber or silicone, to facilitate the pad 12 to resist being damaged by the weight of the motorized vehicle 16.

The pad 12 has a prominence 20 which rises from a top surface 22 of the pad 12 to accommodate the tire 14 when the pad 12 is positioned on the support surface 18. The prominence 20 has a lateral bounding edge 24 which has a plurality of intersecting sides 26 such that the prominence 20 has a rectangular shape. Furthermore, each of the plurality of intersecting sides 26 is spaced from and is oriented parallel to a respective one of a plurality of intersecting sides 28 of a perimeter edge 30 of the pad 12. The pad 12 has a battery access 32 extending through a bottom surface 34 of the pad 12 and a cover 36 is removably insertable into the battery access 32 for closing the battery access 32.

A weight sensor 38 is integrated into the pad 12 to sense the weight of the tire 14 when the motorized vehicle 16 is parked on the pad 12. The weight sensor 38 is positioned between the top surface 22 and the bottom surface 34 of the pad 12 and the weight sensor 38 is aligned with the prominence 20 such that the weight sensor 38 extends along a full length and a full width of the prominence 20. In this way the weight sensor 38 is engaged by the tire 14 regardless of where the tire 14 rests on the prominence 20. The weight sensor 38 may comprise an electronic weight sensor or the like and the weight sensor 38 may be capable of sensing weights which range between approximately 45.0 kg and 1800.0 kg.

A communication unit 40 is integrated into the pad 12 and the communication unit 40 is in communication with the weight sensor 38. The communication unit 40 is in remote communication with a personal electronic device 42 is associated with a user 44 of the motorized vehicle 16. The communication unit 40 broadcasts an alert to the personal electronic device 42 when the weight sensor 38 ceases to sense weight after having sensed weight for a minimum duration of time. In this way the communication unit 40 can alert the user 44, via text on the personal electronic device 42 or other type of alert produced by a smartphone application, that the motorized vehicle 16 has been moved from the pad 12 and has potentially been stolen. The minimum duration of time may range between approximately 2.0 seconds and 10.0 seconds. Additionally, the personal electronic device 42 may comprise a smartphone or other type of electronic device that has wireless communication capabilities. Furthermore, the personal electronic device 42 may store a smartphone application that for communicating with the communication unit 40 and for turning the communication unit 40 on and off.

The communication unit 40 comprises a processor 46 that is integrated into the pad 12 and the processor 46 is electrically coupled to the weight sensor 38. The processor 46 receives a weight input when the weigh sensor senses weight for a trigger duration of time. The processor 46 receives a no-weight input when the weight sensor 38 does not sense weight subsequent to the weight sensor 38 sensing weight for the trigger duration of time. The communication unit 40 includes a transceiver 48 that is integrated into the pad 12 and the transceiver 48 is electrically coupled to the processor 46. The transceiver 48 is in wireless communication with the personal electronic device 42 and the transceiver 48 broadcasts an alert signal to the personal electronic device 42 when the processor 46 receives the no-weight input. The transceiver 48 may comprise a radio frequency transceiver or the like and the transceiver 48 may employ Bluetooth communication protocols. A power supply 50 is integrated into the pad 12 and the power supply 50 is electrically coupled to the processor 46. The power supply 50 comprises at least one battery 52 that is aligned with the battery access 32 in the bottom surface 34 of the pad 12 to facilitate removal and replacement of the at least one battery 52.

In use, the pad 12 is placed on the support surface 18 in a location where the motorized vehicle 16 will commonly be parked. The motorized vehicle 16 is parked such that one of the tires 14 rests upon the pad 12 thereby facilitating the weight sensor 38 to sense the weight of the motorized vehicle 16. The communication unit 40 broadcasts the alert to the personal electronic device 42 when the weight sensor 38 no longer senses the weight of the motorized vehicle 16 in the absence of the user 44 de-activating the communication unit 40 with their personal electronic device 42. In this way the user 44 can be notified that their motorized vehicle 16 has been moved and has potentially been stolen. Furthermore, the pad 12 can be placed beneath any valuable object that is typically stored outside and is at risk of being stolen, including but not being limited to, a toolbox, a motorcycle or construction materials.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A weight sensing parking pad device for alerting an owner of a vehicle when the vehicle has been moved from a parking spot thereby facilitating the user to respond to a potential theft of the vehicle, said device comprising:

a pad having a length and a width being sufficient to accommodate a tire of a motorized vehicle wherein said pad is configured to be placed on a support surface to facilitate the tire of the motorized vehicle to be parked upon said pad, said pad being comprised of a resilient material wherein said pad is configured to resist being damaged by the weight of the motorized vehicle;

a weight sensor being integrated into said pad wherein said weight sensor is configured to sense the weight of the tire when the motorized vehicle is parked on said pad; and a communication unit being integrated into said pad, said communication unit being in communication with said weight sensor, said communication unit being in remote communication with a personal electronic device being associated with a user of the motorized vehicle, said communication unit broadcasting an alert to said personal electronic device when said weight sensor ceases to sense weight after having sensed weight for a preselected minimum duration of time wherein said communication unit is configured to alert the user that the motorized vehicle has been moved from said pad and has potentially been stolen.

2. The device according to claim 1, wherein:

said pad has a prominence rising from a top surface of said pad wherein said prominence is configured to accommodate the tire when said pad is positioned on the support surface;

said prominence has a lateral bounding edge which has a plurality of intersecting sides such that said prominence has a rectangular shape;

each of said plurality of intersecting sides is spaced from and is oriented parallel to a respective one of a plurality of intersecting sides of a perimeter edge of said pad; and said pad has a battery access extending through said bottom surface of said pad.

3. The device according to claim 2, wherein:

said weight sensor is positioned between said top surface and a bottom surface of said pad; and said weight sensor is aligned with said prominence such that said weight sensor extends along a full length and a full width of said prominence wherein said weight sensor is configured to be engaged by the tire regardless of where the tire rests on said prominence.

4. The device according to claim 1, wherein said communication unit comprises:

a processor being integrated into said pad, said processor being electrically coupled to said weight sensor, said processor receiving a weight input when said weigh sensor senses weight for a trigger duration of time, said processor receiving a no-weight input when said weight sensor does not sense weight subsequent to said weight sensor sensing weight for said trigger duration of time; and a transceiver being integrated into said pad, said transceiver being electrically coupled to said processor, said transceiver being in wireless communication with said personal electronic device, said transceiver broadcasting an alert signal to said personal electronic device when said processor receives said no-weight input.

5. The device according to claim 2, wherein said communication unit includes:

a processor being integrated into said pad; and a power supply being integrated into said pad, said power supply being electrically coupled to said processor, said power supply comprising at least one battery being aligned with said battery access in said bottom surface of said pad to facilitate removal and replacement of said at least one battery.

6. A weight sensing parking pad device for alerting an owner of a vehicle when the vehicle has been moved from a parking spot thereby facilitating the user to respond to a potential theft of the vehicle, said device comprising:

a pad having a length and a width being sufficient to accommodate a tire of a motorized vehicle wherein said pad is configured to be placed on a support surface to facilitate the tire of the motorized vehicle to be parked upon said pad, said pad being comprised of a resilient material wherein said pad is configured to resist being damaged by the weight of the motorized vehicle, said pad having a prominence rising from a top surface of said pad wherein said prominence is configured to accommodate the tire when said pad is positioned on the support surface, said prominence having a lateral bounding edge which has a plurality of intersecting sides such that said prominence has a rectangular shape, each of said plurality of intersecting sides being spaced from and being oriented parallel to a respective one of a plurality of intersecting sides of a perimeter edge of said pad, said pad having a battery access extending through said bottom surface of said pad;

a weight sensor being integrated into said pad wherein said weight sensor is configured to sense the weight of the tire when the motorized vehicle is parked on said pad, said weight sensor being positioned between said top surface and a bottom surface of said pad, said weight sensor being aligned with said prominence such that said weight sensor extends along a full length and a full width of said prominence wherein said weight sensor is configured to be engaged by the tire regardless of where the tire rests on said prominence; and a communication unit being integrated into said pad, said communication unit being in communication with said weight sensor, said communication unit being in remote communication with a personal electronic device being associated with a user of the motorized vehicle, said communication unit broadcasting an alert to said personal electronic device when said weight sensor ceases to sense weight after having sensed weight for a preselected minimum duration of time wherein said communication unit is configured to alert the user that the motorized vehicle has been moved from said pad and has potentially been stolen, said communication unit comprising:

a processor being integrated into said pad, said processor being electrically coupled to said weight sensor, said processor receiving a weight input when said weigh sensor senses weight for a trigger duration of time, said processor receiving a no-weight input when said weight sensor does not sense weight subsequent to said weight sensor sensing weight for said trigger duration of time;

a transceiver being integrated into said pad, said transceiver being electrically coupled to said processor, said transceiver being in wireless communication with said personal electronic device, said transceiver broadcasting an alert signal to said personal electronic device when said processor receives said no-weight input; and a power supply being integrated into said pad, said power supply being electrically coupled to said processor, said power supply comprising at least one battery being aligned with said battery access in said bottom surface of said pad to facilitate removal and replacement of said at least one battery.

\* \* \* \* \*